(12) United States Patent
Gao et al.

(10) Patent No.: US 11,055,839 B2
(45) Date of Patent: Jul. 6, 2021

(54) METHOD FOR FAST JUDGING AND OPTIMIZING LIGHT EMITTING QUALITY OF LIGHT GUIDE PLATE BASED ON IMAGE PROCESSING TECHNOLOGY

(71) Applicant: Jiangnan University, Wuxi (CN)

(72) Inventors: Shumei Gao, Wuxi (CN); Ping Li, Wuxi (CN); Weiying Qian, Wuxi (CN); Jianjun Cao, Wuxi (CN); Yan Kong, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 6 days.

(21) Appl. No.: 16/415,335

(22) Filed: May 17, 2019

(65) Prior Publication Data
US 2019/0272629 A1 Sep. 5, 2019

Related U.S. Application Data

(63) Continuation of application No. PCT/CN2018/073770, filed on Jan. 23, 2018.

(30) Foreign Application Priority Data

Aug. 25, 2017 (CN) .......................... 201710741221.8

(51) Int. Cl.
*G06T 7/00* (2017.01)
*G01M 11/00* (2006.01)
*F21V 8/00* (2006.01)
*G06T 5/40* (2006.01)
*F21S 8/00* (2006.01)
*F21Y 115/10* (2016.01)

(52) U.S. Cl.
CPC .............. *G06T 7/0004* (2013.01); *F21S 8/00* (2013.01); *G01M 11/30* (2013.01);
(Continued)

(58) Field of Classification Search
CPC ..................... G06T 7/0004; G06T 5/40; G06T 2207/30168; F21S 8/00; F21Y 2115/10; G01M 11/30; G01M 11/33; G02B 6/0073
See application file for complete search history.

(56) References Cited

U.S. PATENT DOCUMENTS 5,921,651 A * 7/1999 Ishikawa .............. G02B 6/0065
362/23.15
2003/0210210 A1* 11/2003 Ide ....................... G02B 6/0065
345/30
(Continued)

FOREIGN PATENT DOCUMENTS

CN 102829435 A 12/2012
CN 103698938 A 4/2014
(Continued)

OTHER PUBLICATIONS

Chen et al. "Optimization Design for the Dot Pattern of Led Light Guide Plate Using Soft Computing." Journal of Applied Sciences, vol. 13, issue 13, 2013, pp. 2378-2383 (Year: 2013).*
(Continued)

*Primary Examiner* — Jon Chang
(74) *Attorney, Agent, or Firm* — IPro, PLLC

(57) ABSTRACT

The present invention discloses a method for fast judging and optimizing light emitting quality of a light guide plate based on an image processing technology. According to the method, an illuminance diagram of the light guide plate is regarded as a single-color image, illuminance information is converted into a gray level, gray levels of all pixel points are calculated through a gray level histogram, the light outgoing quality of the light guide plate is analyzed according to a discrete degree of the gray levels, positions of the gray levels discrete in distribution in the gray level histogram on the illuminance diagram are found out through programming, a net point filling rate in a corresponding area is directly
(Continued)

optimized and is eliminated, and a uniformity degree evaluation formula with a precision P judgment criterion is given. The present invention effectively improves the optimizing efficiency of the light guide plate, and an optimized result is closer to an actual visual effect.

4 Claims, 5 Drawing Sheets

(52) U.S. Cl.
CPC .............. *G02B 6/0073* (2013.01); *G06T 5/40* (2013.01); *F21Y 2115/10* (2016.08); *G06T 2207/30168* (2013.01)

(56) References Cited

U.S. PATENT DOCUMENTS

2007/0274103 A1* 11/2007 Park ..................... G02B 6/0038
362/620
2010/0070060 A1* 3/2010 Zhao .................. G02B 27/0012
700/97
2016/0178938 A1* 6/2016 Wang ................... G02B 6/0065
445/3
2018/0173058 A1* 6/2018 Yuki ...................... G02B 6/426

FOREIGN PATENT DOCUMENTS

| CN | 106932853 A | 7/2017 |
| CN | 107527340 A | 12/2017 |
| KR | 20120043221 A | 5/2012 |

OTHER PUBLICATIONS

Kim et al. "Optimized Pattern Design of Light-Guide Plate (LGP)." Optica Applicata, vol. XLI, No. 4, 2001, pp. 863-872 (Year: 2001).*
Chen et al. "An Optimization System Applied in Optical Design of LED Light Guide Plate." The Open Mechanical Engineering Journal, 7, 2013, pp. 108-115 (Year: 2013).*

* cited by examiner

METHOD FOR FAST JUDGING AND OPTIMIZING LIGHT EMITTING QUALITY OF LIGHT GUIDE PLATE BASED ON IMAGE PROCESSING TECHNOLOGY

TECHNICAL FIELD

The present application belongs to the field of LED display and lighting, and particularly relates to a method for fast judging and optimizing luminous quality of a light guide plate based on an image processing technology.

BACKGROUND

A light guide plate is an important component of a side entering type LED flat panel lamp, light emitted out of an LED is refracted through bottom surface net points and then is emitted out of a light outgoing surface, and its luminous quality determines a final lighting effect of the flat panel lamp. Net points are an array of optical structures that refract light. A uniformity of luminous emittance of the light guide plate mainly depends on a scattering area and a distribution of net points, and currently, design of the net points is mainly achieved by means of adjusting spacings, sizes, shapes or density. In an optimizing design process, the determination of the uniformity of luminous emittance is essential, and how to fast and accurately determine the spatial distribution of luminous emittance of the light guide plate and a position where a deviation point or area occurs is the key of improving an optimizing speed and quality of the light guide plate, which determines whether next decision making of a designer is right or not, thereby affecting a final design result. The uniformity of luminous emittance is a main part for evaluating luminous quality of the light guide plate. Existing evaluation methods for the uniformity of luminous emittance of the light guide plate are mainly software evaluation or multi-point measurement methods. Since the evaluation methods are different, their optimized results do not have comparability. Moreover, the evaluation methods do not comprehensively calculate the spatial distribution of luminous emittance of the light outgoing surface, and selected pixel points have a certain degree of one-sidedness, so that the evaluation results are not objective enough. Thus, it is crucially important to propose a reasonable and effective evaluation method in an optimizing process.

SUMMARY

The present invention provides a method for fast judging and optimizing luminous quality of a light guide plate based on an image processing technology, so as to solve a technical problem.

In order to solve the technical problem, the present invention adopts a following technical solution: acquiring a spatial distribution of luminous emittance from a light guide plate and acquiring luminous emittance information according to the spatial distribution of luminous emittance; firstly, converting the luminous emittance information of the light guide plate into gray levels to obtain a gray level histogram, and then identifying pixels whose intensity values deviate from a peak in the histogram by more than a threshold; reducing deviation of the intensity values of the identified pixels by altering optical structures of the light guide plate at locations corresponding to the identified pixels; and evaluating a uniformity of luminous emittance of the light guide plate by a formula with a precision P judgment criterion, wherein a uniformity measure U is defined as a sum of frequencies Ng/N of all the gray levels within a range of P around the gray level $g_m$ at the peak:

$$U = \sum_{g=g_m-P}^{g_m+P} \frac{N_g}{N}.$$

When the solution is carried out, firstly, the spatial distribution of luminous emittance of the light guide plate is regarded as a single-color image, that is, original intensity values of pixels of the image are all represented with gray levels. In this way, luminous emittance information of all pixels on the light guide plate is converted into the gray levels, and data of the gray levels is stored in a matrix form. Then, occurrence frequencies of the gray levels of all the pixels are represented in a form of a histogram, so that the overall distribution of luminous emittance is analyzed visually and comprehensively. The distribution range of the gray levels shows a uniformity of luminous emittance, and magnitudes of the gray levels reflect magnitudes of the luminous emittance values. The uniformity of luminous emittance of the light guide plate is analyzed according to a discrete degree of the gray levels. A range of the gray levels is narrowed to improve the uniformity. The gray levels are improved as a whole so as to improve luminous efficacy. The pixels whose intensity values deviate from a peak in the histogram by more than a threshold are identified. The deviation of the intensity values of the identified pixels is reduced by altering the optical structure of the light guide plate at locations corresponding to the identified pixels. Based on the gray level histogram, the sum of the frequencies Ng/N of the gray levels within the certain range P around the gray level $g_m$ at the peak is selected as a formula of evaluating the uniformity measure U with the precision P judgment criterion, $$U = \sum_{g=g_m-P}^{g_m+P} \frac{N_g}{N}.$$

Further, altering the optical structures comprises altering a number density of net points on the light guide plate. Further, altering the optical structures of the light guide plate is based on a relationship between the optical structures and luminous emittance.

Further, the net points have a shape of a conical frustum, a sphere or a cone.

Further, altering the optical structures comprises altering sizes of or spacings among net points on the light guide plate.

Further, the spatial distribution of luminous emittance is an image obtained by software simulation or other detecting elements such as a CCD (Charge-Coupled Device).

The present invention has the following beneficial effects: by converting the spatial distribution of luminous emittance into a grayscale image, and storing the luminous emittance information in a matrix, information extraction becomes fast and convenient; based on the gray histogram, the luminous surface information is analyzed comprehensively, the luminous quality of the light guide plate is directly analyzed according to the gray level distribution, and an accidental error caused by a fact that an evaluation formula used by existing TracePro software and an existing multi-point measurement method cannot calculate all luminous data is avoided; the pixels whose intensity values deviate from a peak in the histogram by more than a threshold are identified and the deviation of the intensity values of the identified pixels is reduced by altering the net points of the light guide plate at locations corresponding to the identified pixels so that precise and fast optimization is achieved easily, and the optimized result is closer to an actual visual effect; and the concept of judgment precision P is proposed, which is convenient for products in different industries to have different evaluation standards.

In the figures: 1—net points, 2—light guide plate, 3—LED light source, 4—detecting screen.

DETAILED DESCRIPTION

In order to elaborate the present invention in detail, the following is illustrated in conjunction with drawings. But examples taken as examples below are only used for explaining a method of the present invention, and cannot be used for judging or limiting its range of application.

Example

Figure 1:
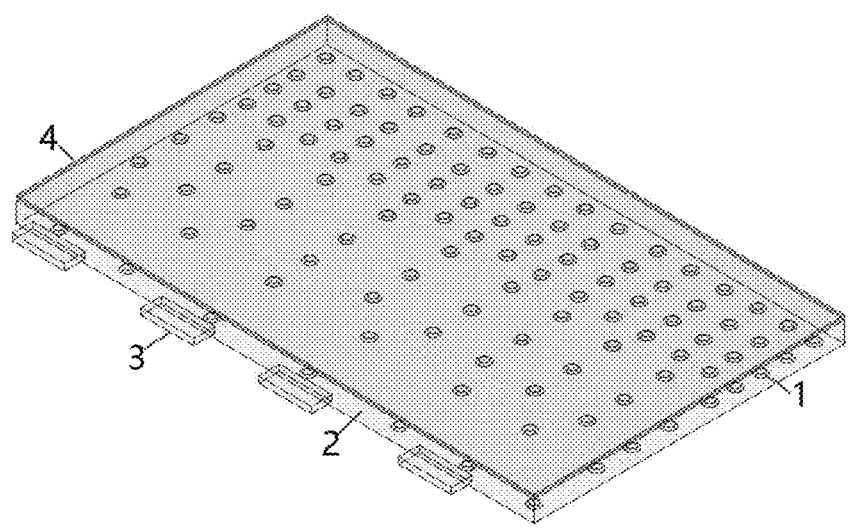
FIG. 1 is a model schematic diagram of a light guide plate used by the present invention.
Figure 2:
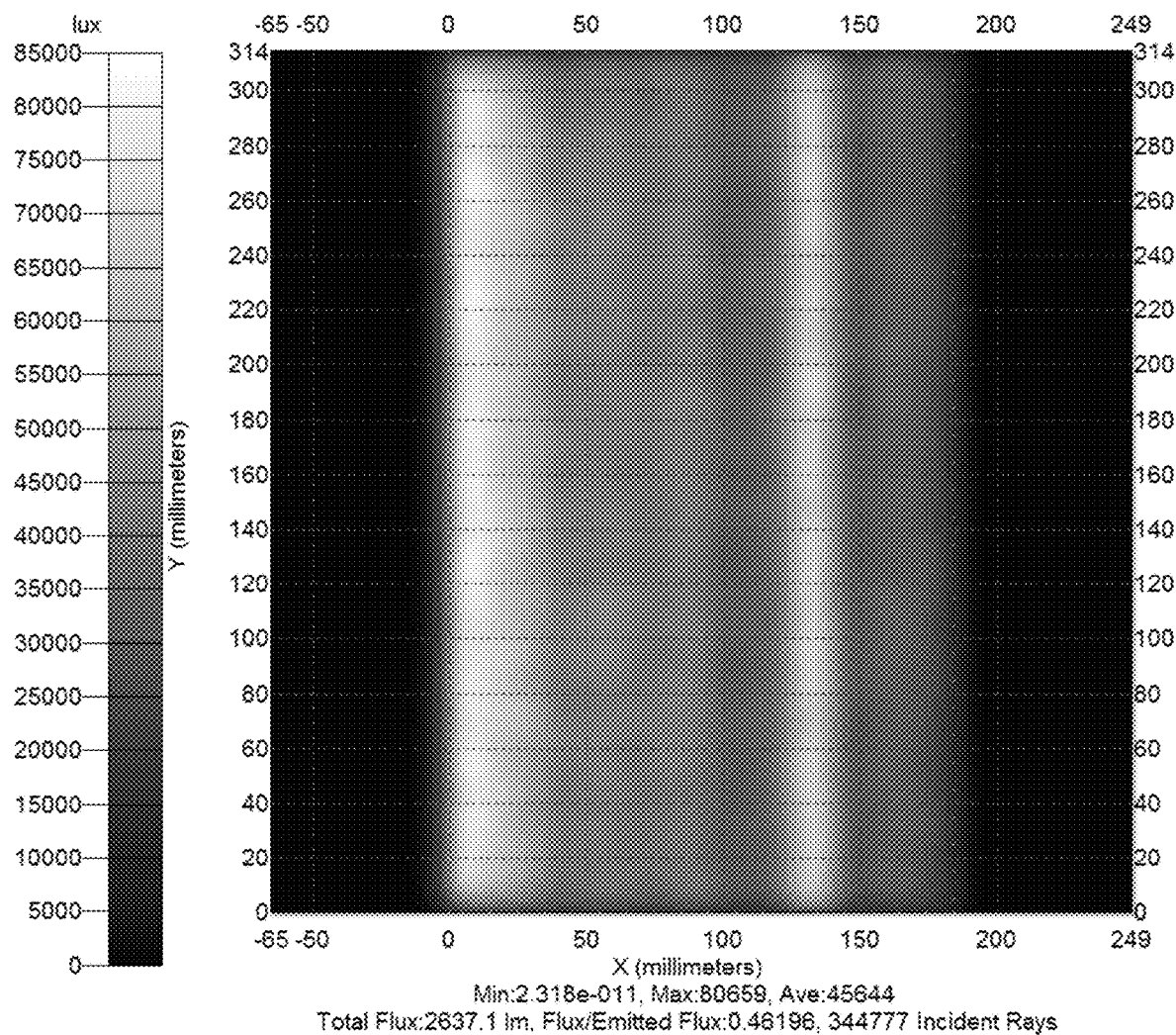
FIG. 2 is a spatial distribution of luminous emittance before optimization.
Figure 3:
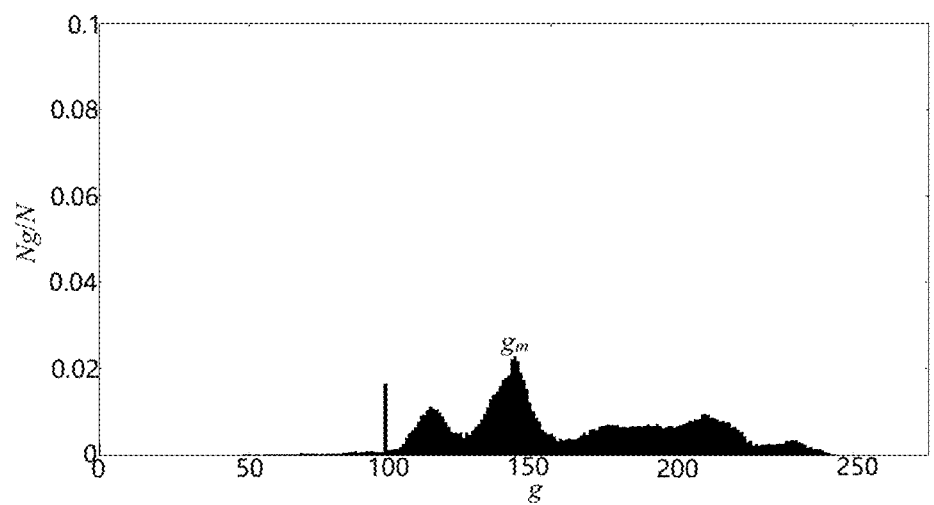
FIG. 3 is a gray level histogram obtained from the spatial distribution of luminous emittance before optimization.
Figure 4:
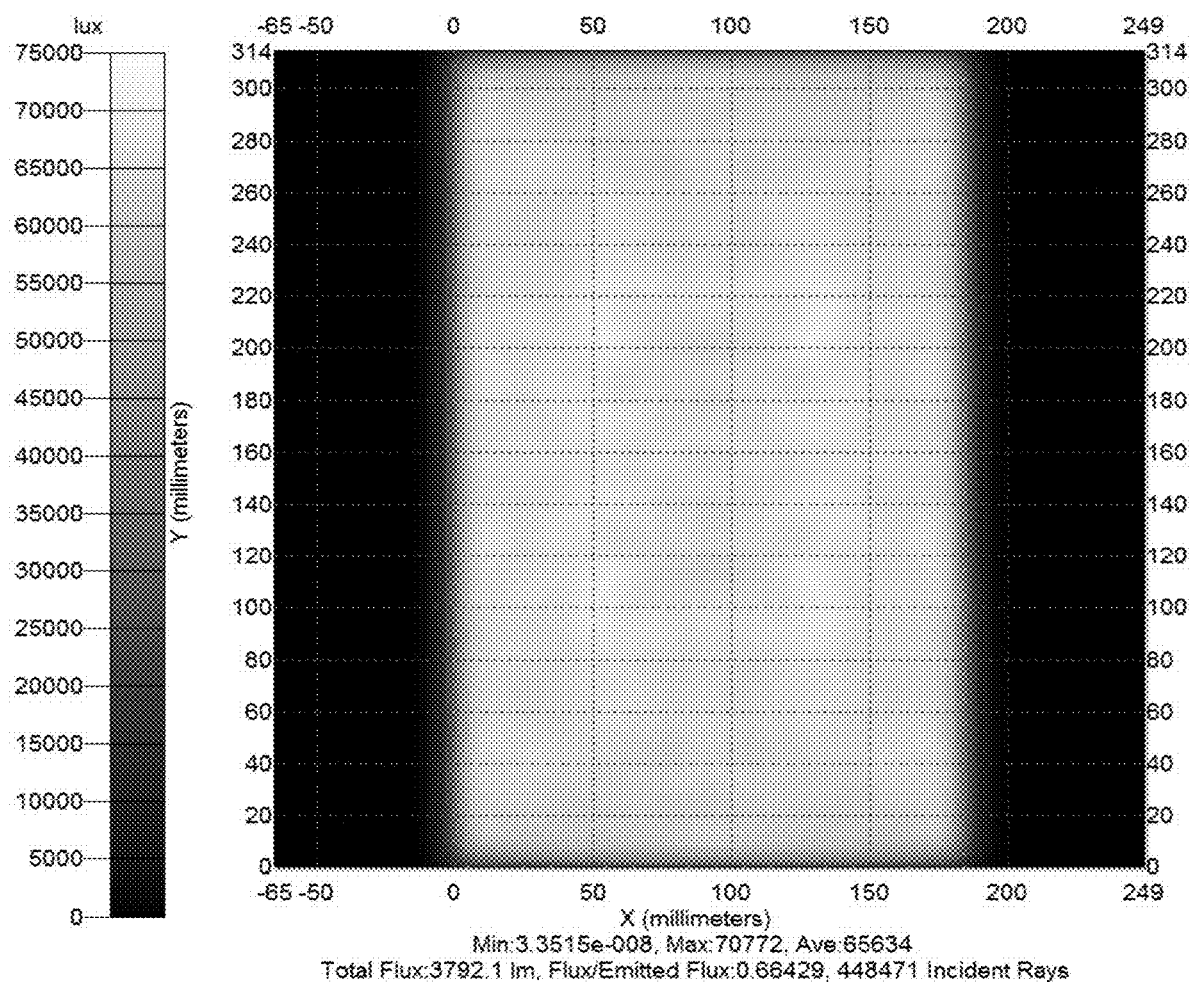
FIG. 4 is a spatial distribution of luminous emittance after optimization.
Figure 5:
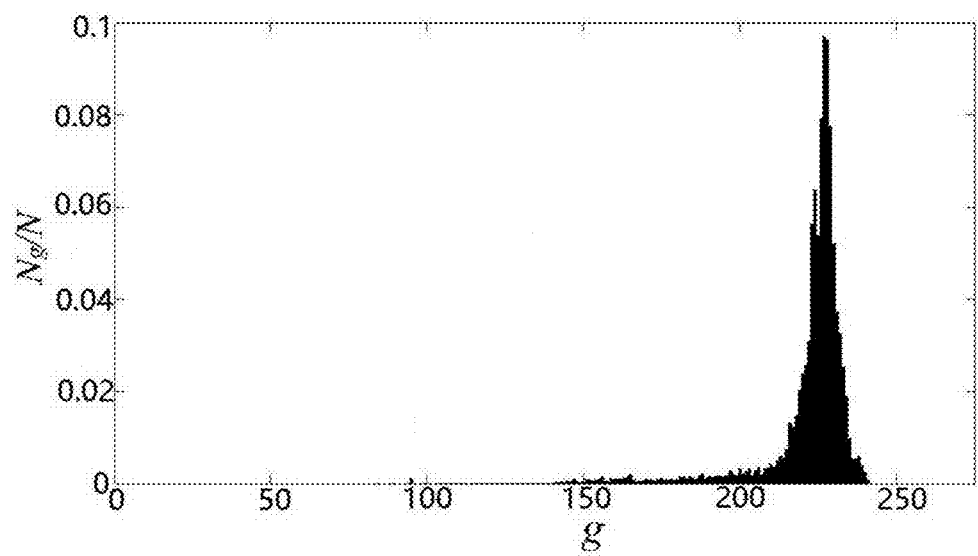
FIG. 5 is a gray level histogram obtained from the spatial distribution of luminous emittance after optimization.

FIG. 1 is a model diagram used by the present invention in a simulating process. modeling is performed on a light guide plate 2 with net points having a shape of a conical frustum as an example, wherein a light source is an LED light source 3, a detecting screen 4 is added above a light outgoing surface, and luminous emittance information is detected so that a spatial distribution of luminous emittance as shown in FIG. 2 is obtained. A gray level histogram represents luminous emittance information as shown in FIG. 3, a finally optimized spatial distribution of luminous emittance is as shown in FIG. 4, and a gray level histogram after optimization is as shown in FIG. 5.

A method for fast judging and optimizing luminous quality of a light guide plate based on an image processing technology includes the following specific steps:

1. Modeling is performed by ray tracing software, wherein as shown in FIG. 1, the LED light sources 3 are arranged on one side of the light guide plate 2, the detecting screen 4 is added above the light outgoing surface, the net points having the shape of the conical frustum are arranged on a bottom surface, and initial ray tracing is performed.

2. A spatial distribution of luminous emittance of the light guide plate before optimization as shown in FIG. 2 is obtained. By software evaluation, a uniformity of luminous emittance is 56.6%, and luminous efficacy is 46.2%. The spatial distribution of luminous emittance is converted into a grayscale image, a histogram of intensity values of pixels of the grayscale image is compiled, and then certain pixels are identified based on their intensity values in the histogram, as shown in FIG. 3. At this time, a gray level at the peak is $g_m$=148, and when P=20, according to a formula for evaluating a uniformity of luminous emittance, U=27.6%, and a gray level distribution range is 147.

3. On the basis of FIG. 3, a range of the intensity values of the identified pixels is reduced by altering the net points of the light guide plate at locations corresponding to the identified pixels. Then, a spatial distribution of luminous emittance after optimization as shown in FIG. 4 is obtained. By software evaluation, the uniformity of luminous emittance reaches 93%, and the luminous efficacy is 66.5%. In the gray level histogram of FIG. 5, $g_m$=227, and when P=20, U=90.3%, and a gray level distribution range is 90. Compared with before optimization, the luminous efficacy is improved by 20.3%, the uniformity is improved by 62.7%, and the gray level distribution range is reduced by 57.

Further, a size of the light guide plate in step 1 is 184*314*0.55 mm$^3$.

Further, the ray tracing software in step 1 is any one in TracePro and Lightools.

It needs to be noted that the spatial distribution of luminous emittance may be an image obtained by software simulation, or other detecting elements such as a CCD (Charge-Coupled Device).

The basic principle, main characteristics and advantages of the present invention are displayed and described above. What is described in the above example and the description only explains the principle of the present invention, on a premise without breaking away from spirit and a scope of the present invention, the present invention can also have various changes and improvements, and the changes and improvements all fall into the protective scope of the present invention. The protective range of the present invention is defined by attached claims and its equivalents.

What is claimed is:

1. A method comprising:
acquiring a spatial distribution of luminous emittance from a light guide plate as a grayscale image;
compiling a histogram of intensity values of pixels of the grayscale image;
identifying pixels based on their intensity values in the histogram; and
reducing a range of the intensity values of the identified pixels by altering optical structures of the light guide plate at locations corresponding to the identified pixels.

2. The method according to claim 1, further comprising evaluating uniformity of the luminous emittance from the light guide plate using a formula:

$$U = \sum_{g=g_m-P}^{g_m+P} \frac{N_g}{N}$$

wherein $N_g$ is a number of the pixels whose intensity values are g, N is a total number of the pixels, U is a measure of the uniformity, and $g_m$ is a gray level at the peak.

3. The method according to claim 1, wherein altering the optical structures comprises adjusting a spacing, a size, a shape or a density of net points on the light guide plate.

4. The method according to claim 3, wherein the net points have a shape of a conical frustum, a sphere or a cone.

* * * * *